(12) United States Patent
Gutruf et al.

(10) Patent No.: US 10,082,400 B2
(45) Date of Patent: Sep. 25, 2018

(54) CHARGING STRATEGY

(71) Applicant: MAGNA STEYR Fahrzeugtechnik AG & Co KG, Graz (AT)

(72) Inventors: Philipp Gutruf, Munich (DE); Julian Goellner, Graz (AT); Michael Martin, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 87 days.

(21) Appl. No.: 15/345,706

(22) Filed: Nov. 8, 2016

(65) Prior Publication Data
US 2017/0191844 A1 Jul. 6, 2017

(30) Foreign Application Priority Data

Nov. 25, 2015 (EP) ...................... 15196235
Apr. 27, 2016 (EP) ...................... 16167255

(51) Int. Cl.
*G01C 21/36* (2006.01)
*B60L 11/12* (2006.01)
(Continued)

(52) U.S. Cl.
CPC ........ *G01C 21/3469* (2013.01); *B60L 11/123* (2013.01); *B60L 11/1861* (2013.01); *B60L 11/1862* (2013.01); *B60L 11/1887* (2013.01); *B60L 15/20* (2013.01); *B60L 15/2045* (2013.01); *B60W 10/08* (2013.01); *B60W 10/26* (2013.01); *B60W 10/28* (2013.01); *B60W 20/12* (2016.01); *B60W 20/16* (2016.01); *B60W 20/20* (2013.01); *G01C 21/3614* (2013.01); *G01C 21/3676* (2013.01); *B60L 2240/622* (2013.01); *B60L 2240/72* (2013.01); *B60L 2250/16* (2013.01); *B60L 2260/44* (2013.01); *B60L 2260/52* (2013.01); *B60L 2260/54* (2013.01); *B60L 2270/12* (2013.01); *B60W 2510/244* (2013.01); *B60W 2510/28* (2013.01); *B60W 2560/02* (2013.01); *Y02T 10/6217* (2013.01); *Y02T 10/645* (2013.01); *Y02T 10/705* (2013.01); *Y02T 10/7044* (2013.01);
(Continued)

(58) Field of Classification Search
CPC .. E02F 9/267; E02F 3/308; E02F 3/32; G07C 5/0816; G07C 5/0841; G07C 5/0833; G07C 5/0808; G07C 5/008; G07C 5/0825; G01L 1/16
See application file for complete search history.

(56) References Cited

U.S. PATENT DOCUMENTS

| 5,892,346 A | 4/1999 | Moroto et al. |
| 7,013,205 B1 | 3/2006 | Hafner et al. |
(Continued)

FOREIGN PATENT DOCUMENTS

| DE | 112008001054 T5 | 2/2010 |
| DE | 102009016869 A1 | 10/2010 |
(Continued)

*Primary Examiner* — Rodney A Butler
(74) *Attorney, Agent, or Firm* — Jordan IP Law, LLC; Todd A. Vaughn

(57) ABSTRACT

A method for determining and optionally additionally implementing an optimal route for a vehicle that has an electrical drive system having an energy storage device, and a converter to charge the energy storage device.

18 Claims, 4 Drawing Sheets

(51) Int. Cl.
*B60W 20/20* (2016.01)
*G01C 21/34* (2006.01)
*B60L 11/18* (2006.01)
*B60L 15/20* (2006.01)
*B60W 10/08* (2006.01)
*B60W 10/26* (2006.01)
*B60W 10/28* (2006.01)
*B60W 20/12* (2016.01)
*B60W 20/16* (2016.01)

(52) U.S. Cl.
CPC ............ *Y02T 10/7077* (2013.01); *Y02T 10/72* (2013.01); *Y02T 10/7283* (2013.01); *Y02T 10/7291* (2013.01); *Y02T 90/16* (2013.01); *Y02T 90/162* (2013.01); *Y02T 90/163* (2013.01); *Y02T 90/34* (2013.01)

(56) References Cited

U.S. PATENT DOCUMENTS

| | | |
|---|---|---|
| 2011/0172867 A1 | 7/2011 | Yu et al. |
| 2013/0144519 A1* | 6/2013 | Nakano .................. B60K 15/00 701/123 |
| 2015/0019115 A1* | 1/2015 | Kim .................. G01C 21/3469 701/117 |
| 2016/0137077 A1* | 5/2016 | Kim .................. B60L 11/1809 701/22 |
| 2016/0139600 A1* | 5/2016 | Delp .................. B67D 7/04 701/26 |
| 2017/0174204 A1* | 6/2017 | Jones .................. B60W 20/12 |

FOREIGN PATENT DOCUMENTS

| | | |
|---|---|---|
| DE | 102010043690 A1 | 5/2012 |
| DE | 102011108381 A1 | 1/2013 |
| DE | 112011102395 T5 | 5/2013 |
| DE | 102012011996 A1 | 12/2013 |
| DE | 102013201745 A1 | 8/2014 |
| DE | 102013211871 A1 | 12/2014 |
| DE | 102013013540 A1 | 2/2015 |
| DE | 102013224896 A1 | 6/2015 |
| EP | 2230146 A2 | 9/2010 |
| JP | 2010173360 A | 8/2010 |
| KR | 101634870 B1 * | 6/2016 |
| WO | 2015110129 A1 | 7/2015 |

* cited by examiner

CHARGING STRATEGY

CROSS-REFERENCE TO RELATED APPLICATIONS

The present application claims priority 35 U.S.C. § 119 to European Patent Publication Nos. EP 15196235.4 (filed on Nov. 25, 2015) and EP 16167255.5 (filed on Apr. 27, 2016), which are each hereby incorporated by reference in their complete, respective entireties.

TECHNICAL FIELD

Embodiments relate to a method for determining and optionally additionally implementing an optimal route for a vehicle that has an electrical drive system having an energy storage device, and a converter (which is operated via a fuel) to charge the energy storage device.

BACKGROUND

Methods for determining an optimal route are supported, as is known per se, in particular via a navigation system, such as is used by way of example in GPS (Global Positioning System) navigation systems in order to provide or propose to the user of the system, in particular a driver of a vehicle, at least one suitable route to a predetermined destination.

It is also known for an electric vehicle to take into account the locations of charging stations for the energy storage device of the electric vehicle when planning a journey. German Patent Publication No. DE 10 2011 108 381 A1, by way of example, discloses a method for an electric vehicle in order to output information regarding a whole area in which journey destinations may be reached using the electric vehicle. For this purpose, a starting area is initially determined, whose limits may be reached using the electric vehicle from a current location of the electric vehicle and based on a prevailing state of charge of the energy storage device of said vehicle without recharging with energy. Locations of charging stations for the electric vehicle are then determined in the starting area.

The phrase "implementing a route via the vehicle," wherein the vehicle comprises an electrical drive system and a converter, is understood to mean that the electrical drive and the converter of the vehicle are operated so as to drive along the relevant route, wherein the electrical drive system and the converter are switched on and switched off with regard to suitably and in particular economically following the route and/or may be operated with a higher or lesser power. A method of this type for implementing a route is also referred to as an operating strategy, in particular, an operating strategy related to distance, or as a charging strategy, in particular as a strategy for charging a vehicle in relation to distance.

A vehicle that comprises an electrical drive system having an energy storage device and a converter, wherein the converter may be operated via a fuel, wherein the energy storage device of the electrical drive may be charged by way of the converter represents a so-called "range extender". In other words, the "converter" represents an energy converter that can convert the non-electrical energy that is contained in a fuel at least in part into electrical energy. The drive of a vehicle of this type may be provided by way of example primarily or exclusively by way of the electrical drive system. The converter can in any case be used for the purpose of charging the energy storage device of the electrical drive system in order to thus increase the range of the vehicle under electrical power. Depending upon the type of converter, the vehicle can possibly also be driven directly by way of the converter or by way of the energy that is provided via this converter.

The converter may be, by way of example, an internal combustion engine coupled to a generator or a gas turbine. It is also known to use as a converter a fuel cell that is operated using hydrogen or another suitable fuel.

In particular for vehicles having a fuel cell drive, the selection of a suitable route and the implementation of an intelligent charging strategy is particularly expedient but also particularly challenging since the currently available charging infrastructure of hydrogen refueling stations has large gaps and moreover the power and dynamics of fuel cells is limited for driving the vehicle directly. On the other hand, hydrogen storage devices may be filled or refueled considerably more rapidly than electrical energy storage devices, which also provides advantages in the future in the case of a better structured refueling station network. Moreover, it is possible to operate a fuel cell, by way of example for charging the electrical energy storage device, in an emission-free manner and in particular also in a noise-free manner, as a result of which scenarios for transferring or reallocating energy are rendered possible that would otherwise not be possible or would be less expedient for other converters.

SUMMARY

Embodiments relate to a method for determining and optionally additionally implementing an optimal route for a vehicle (such implementation may occur via the vehicle), wherein the vehicle comprises a converter and an electrical drive system having an energy storage device, wherein the converter may be operated via a fuel, wherein the energy storage device of the electrical drive may be charged by way of the converter so that the different characteristics of the two energy storage devices are taken into account and an economically expedient route may be proposed or successfully followed.

Embodiments relate to a method for determining and optionally additionally implementing an optimal route for a vehicle (such implementation may occur via the vehicle), the vehicle comprising an electrical drive system having an energy storage device and a converter that may be operated via a fuel and which is to charge the energy storage device of the electrical drive system, the method comprising: providing a destination by the user, in particular via an Human Machine Interface (HMI); determining one or more possible routes from a current position to the destination, wherein said one or more routes is/are determined via a geographical position of refueling stations for the fuel and electric charging stations in the region between the current position and the destination; and setting the optimal route via selecting the possible determined routes, wherein the selection may be performed by the user or also automatically without user engagement. Optionally, the optimal route may be implemented via expediently operating, in other words, switching the converter on and off, so as to charge the energy storage device when driving along the optimal route.

In accordance with embodiments, the position of electric charging stations and refueling stations for the fuel of the converter is provided via the use of corresponding position coordinates via a GPS navigation system so as to calculate possible routes to a predetermined destination. The possible routes that are determined after taking into account additional data, such as, for example, estimated journey times, charging/refueling possibilities inclusive of necessary additional time taken (charging times or refueling times), prevailing fuel supply, range of the respective drive system in the case of prevailing fill levels, possible tank volumes, possible consumption on the respective routes, characteristics of the routes and the intermediate positions and end positions, may either be visually displayed to the user, pre-selected, and thus, visually displayed to the user in a limited manner, or also may be evaluated in a fully automated manner in order to select an optimal route from the possible routes that are determined.

In accordance with embodiments, the term "fuel" does not refer to electrical current but rather a substance, generally a fluid or gaseous substance. The converter may be a hydrogen drive system in which the fuel may be hydrogen.

Advantageously, the different characteristics of the energy storage devices may be taken into account using the method in accordance with embodiments, and an economically expedient route may be proposed or followed. The journey time and/or the journey costs may thus be influenced in dependence upon the energy source. If the drive is provided exclusively via the electrical drive system, the journey costs may be reduced with respect to the pure drive via the converter, by way of example, in the case of high fuel prices, however, the journey time is increased owing to the longer electrical charging times.

In accordance with embodiments, the route is determined in dependence upon the usable charging power of the charging systems that are present (electricity or fuel) and/or a pressure level at a possible refueling station and/or a charging power at a possible charging station and/or other system limits of the energy storage device in question. Not every electric charging station can provide sufficient energy at any particular time. When selecting the electric charging station route, it is therefore necessary to take into account whether the charging capacity that is available at the charging station is also sufficient for the vehicle or whether the battery could be charged more rapidly at another charging station that has a greater charging capacity. If the fuel in the vehicle is transported in a pressure tank, it is necessary when selecting the fuel refueling station route to take into account the pressure that is available at the refueling station for the respective fuel. If by way of example the pressure at the refueling station is significantly lower than the standard pressure of the tank container that is located in the vehicle, the range of the vehicle is limited. If the tank pressure is too high at the refueling station, it may not possible to refuel the vehicle.

In accordance with embodiments, the possible routes that are determined comprise at least one route that is optimized for the preferred use of refueling stations for the fuel and/or at least one route that is optimized for the preferred use of electric charging stations. In particular, a route may be proposed to the user of the system, the route prioritizing a stop to refill the fuel of the converter, such as, for example, hydrogen, and a route is proposed that prioritizes a non-fuel source, such as, for example, electrical charging. The user can select from these two proposed routes the optimal route which from their point of view can by way of example provide the most cost-optimized or time-optimized route.

In accordance with embodiments, the possible routes that are determined, in particular two possible routes, may be visually displayed or proposed to the user via the HMI, wherein in particular at least one route is suggested that is optimized for the preferred use of refueling stations for the fuel and at least one route is suggested that is optimized for the use of electric charging stations.

In accordance with embodiments, the optimal route may be selected from the determined routes by the user, in other words, the driver or passenger of the vehicle. Alternatively or additionally, the optimal route may be selected automatically or semi-automatically via the method, wherein a route may be particularly recommended to the user.

In the event of the route being a route that is optimized for the preferred use of refueling stations for fuel, in other words, a route that prioritizes refueling with hydrogen, the optimal route may be implemented in such a manner that the converter is used as intensely as possible so that when reaching a refueling station for the fuel, the fill level of fuel is as low as possible, in particular, the fuel tank is approximately empty when arriving at a designated fuel refueling station. The intense use of the converter can include, for example, intensely charging the energy storage device while following the route, by way of example, also additionally using the converter to drive the vehicle.

In the event of the optimal route being a route that is optimized for the preferred use of electric charging stations, in other words a route that prioritizes charging with electricity, the optimal route may be implemented in such a manner that the electrical drive system is used as intensely as possible so that, when reaching an electric charging station, the state of charge of the energy storage device is as low as possible, wherein "as low as possible" can mean, in accordance with embodiments, that a defined lower energy content is achieved since a full discharge of an energy storage device is disadvantageous for said energy storage device.

In accordance with embodiments, the possible routes may be determined in dependence upon the prevailing state of charge of the energy storage device (SOC) and/or the prevailing fill capacity of fuel for the converter and can take into account the ability to reach charging/refueling stations for the fuel and/or for the electrical current.

In accordance with embodiments, the possible routes may be determined in dependence upon emissions requirements during the course of the route and/or at the destination. For example, it may be taken into account that it is possible to use the converter in a building or in a city with zero emissions regulations. The possible routes can also be determined in dependence upon probable subsequent routes, for which purpose by way of example routes that have been previously followed may be taken into account.

In accordance with embodiments, the optimal route may be implemented in such a manner that in particular in the event of the state of charge of the energy storage device being low at the destination, after reaching the destination, in particular when parking the vehicle, the converter is operated in order to charge the energy storage device.

In accordance with embodiments, a vehicle can comprise a control unit, an electrical drive system having an energy storage device, and a converter to charge the energy storage device, and that is operated via a fuel, wherein the control unit is configured so as to perform a method as described herein.

DRAWINGS

Embodiments will be illustrated by way of example in the drawings and explained in the description below.

DESCRIPTION

Figure 1:
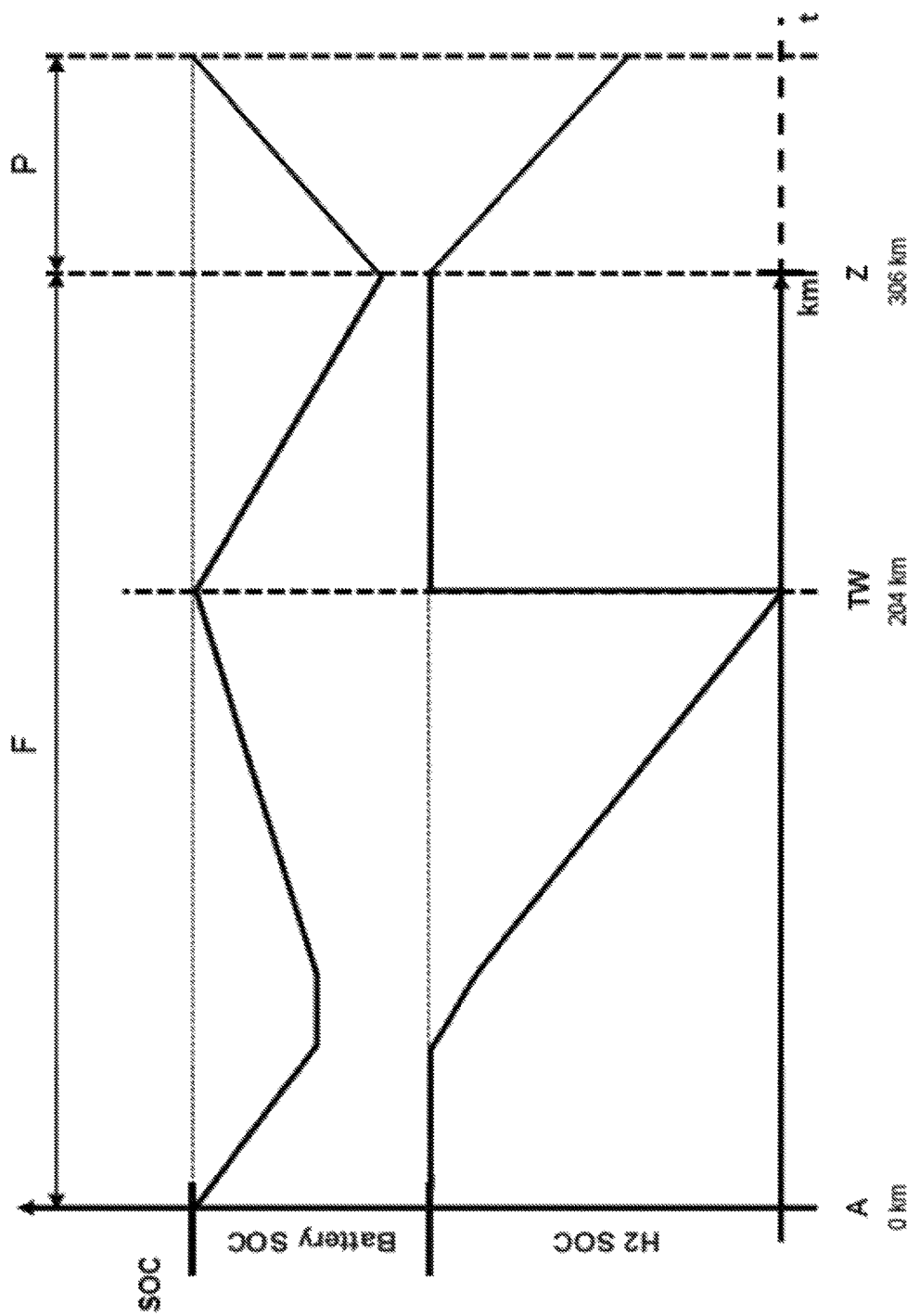
FIG. 1 illustrates schematically an optimal route that may be determined and implemented via a method in accordance with embodiments.
Figure 2:
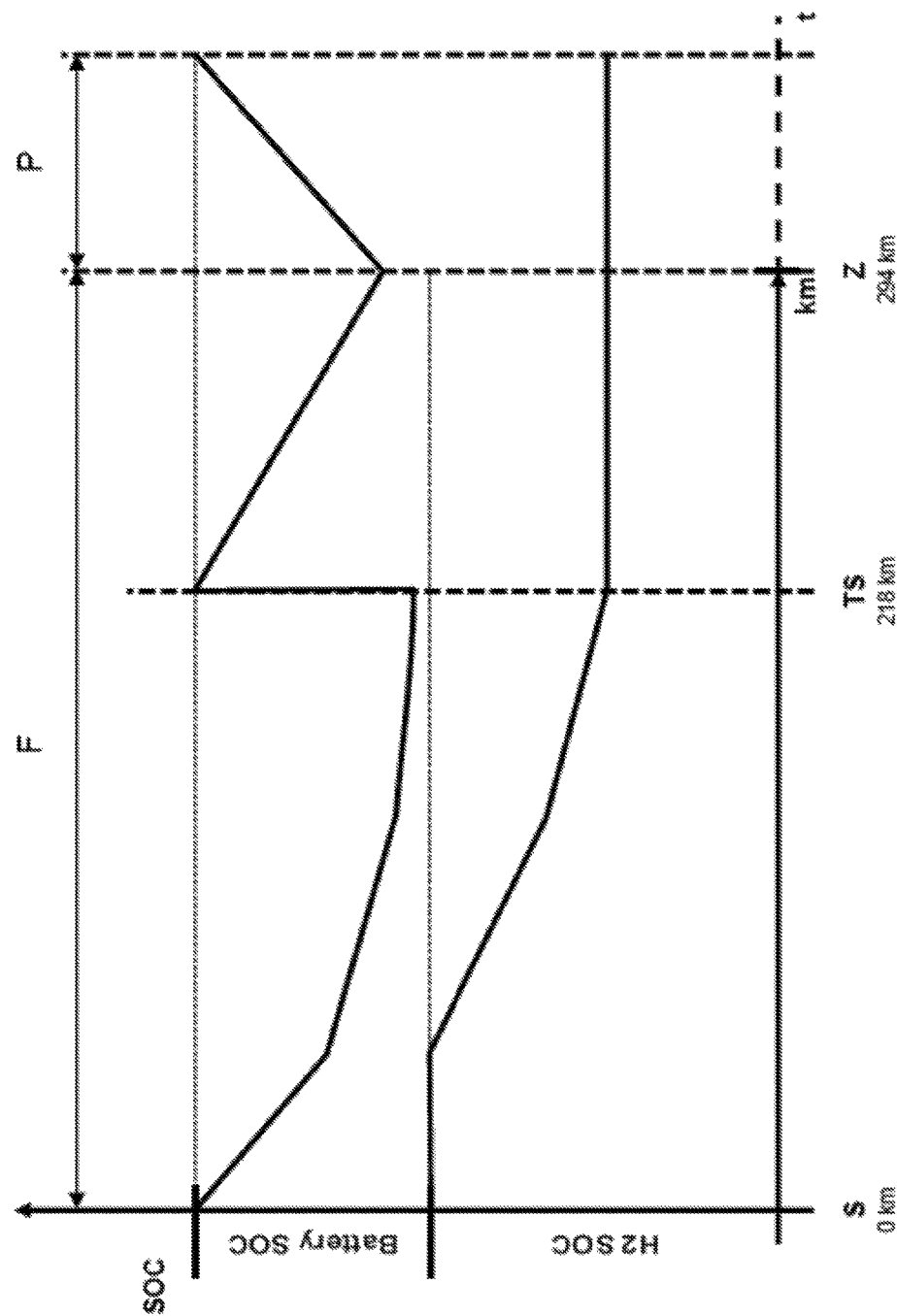
FIG. 2 illustrates schematically an alternative optimal route that may be determined and implemented via a method in accordance with embodiments.

FIGS. 1 and 2 illustrate schematically two possible optimal routes that may be determined and implemented via a method in accordance with embodiments.

The method in accordance with embodiments is explained with reference to a fictitious route distance F. A fuel cell that is operated as a converter of the vehicle using, for example, hydrogen ($H_2$) is provided.

In operation, a driver of the vehicle would like to travel the route distance F between a first specific destination, e.g., Munich central station, as a starting position and current position A and a second specific destination, e.g., Karlsruhe central station as the destination Z. Since the range of the vehicle is not sufficient to cover the entire distance of the route distance F, it is necessary to refuel with hydrogen or electrical energy. In the example, for this purpose, there is a refueling station TW for refueling with hydrogen between Munich and Karlsruhe 204 km after S, in other words Munich. If the vehicle travels to this refueling station, the entire journey to the destination Z, Karlsruhe central station, becomes 306 km. Moreover, there is an electric charging station TS in Stuttgart 218 km after the start point S in Munich. When travelling to this electric charging station TS, an entire journey to the destination becomes 294 km.

As a result, the method in accordance with embodiments proposes to the driver two determined routes that prioritize the two refueling possibilities differently. In other words, determining the routes based upon the two possible energy forms for operating the drive system. The selection of the optimal route that is finally to be implemented may be done manually, for example, by the driver. The first route that is determined prioritizes refueling with hydrogen and is illustrated in FIG. 1. The second route that is determined prioritizes charging with electricity and is illustrated in FIG. 2.

The route that is illustrated in FIG. 1 and prioritizes refueling with hydrogen is determined via the method in accordance with embodiments in such a manner that said route is optimized so as to render it possible to refuel with hydrogen as much as possible at the hydrogen refueling stations that are present in the region between the starting point and the destination in order to achieve a maximum range of the vehicle. The energy storage device of the electrical drive system is used as a buffer storage device in order to temporarily store the energy of the hydrogen. As complete as possible a refueling of hydrogen is to be rendered possible if a hydrogen refueling station is located within the range of the vehicle.

For this purpose, in a first time period, the vehicle only drives by way of the electrical drive, and the fuel cell is not operated or remains deactivated.

In a subsequent second time period, initially the fuel cell is operated using a lower or minimal power that is required for the drive of the vehicle and possible additional units so that the stored energy of the electrical drive (Battery SOC) remains at a constant level.

In a subsequent third time period, the fuel cell is operated using a higher power than is required for driving the vehicle and possible additional units and the rest of the energy obtained from the hydrogen is used to charge the electrical energy storage device.

When arriving at the hydrogen refueling station TW, the hydrogen tank is empty so that the tank may be refueled with as much hydrogen as possible, namely the entire hydrogen tank volume (H2 SOC). The electrical storage device (Battery SOC) completely is charged via the preceding charging procedure by way of the fuel cell when reaching the hydrogen refueling station TW. The transitions between the time periods are determined in such a manner that at the planned intermediate station 'hydrogen refueling station TW' the hydrogen tank is empty (H2 SOC) and the electrical energy storage device (Battery SOC) are fully charged as much as possible. After leaving the hydrogen refueling station TW, only electrical energy is used to drive the vehicle to the destination Z and the fuel cell is not operated since a hydrogen refueling station is not available at the destination.

If the destination Z has been reached with a low electrical state of charge (Battery SOC) and an external charging procedure is not possible by way of an electric charging station, the vehicle offers the function of an emission free charging procedure of the electrical storage device via the hydrogen drive. The charging procedure may be performed in the parked state P anywhere, even in enclosed spaces. At the start of the next journey, the driver is to have a sufficiently high battery state of charge (Battery SOC).

In the case of the route that is illustrated in FIG. 2 and prioritizes electrical recharging, the route distance F is selected by a method in accordance with embodiments in such a manner that the electrical battery is empty at a defined electric charging station TS as an intermediate station or preferably the state of charge (Battery SOC) is at a defined lower threshold value in order to render possible a maximum recharging of the electrical current.

For this purpose, in a first time period the vehicle is driven electrically without operating or activating the fuel cell.

Subsequently, in a second time period, the hydrogen drive system is used in order to charge the electrical energy storage device of the electrical drive (Battery SOC) during the journey, so that it is at all possible to reach the intermediate station electric charging station TS.

When reaching the electric charging station TS, the electrical state of charge (Battery SOC) is at a defined minimum threshold value, the hydrogen tank (H2 SOC) is in part emptied and cannot be currently refueled. Electrical current may be recharged at the electric charging station TS. After leaving the electric charging station TS, the vehicle is driven exclusively by the electrical drive, the fuel cell is not operated. When reaching the destination Z, the electrical energy storage device (Battery SOC) may be recharged, by way of example, via a current-charging possibility at the destination car park Z. If such a charging possibility is not present, the fuel cell can also be operated at a standstill in order to raise the state of charge of the energy storage device.

If the driver selects the route of refueling with hydrogen (FIG. 1), the route distance increases by 12 km. However, the vehicle is refueled with hydrogen in a few minutes. If the route of charging with electricity (FIG. 2) is selected, the total distance reduces to 294 km. However, the journey time increases by the charging time that can last multiple hours depending upon the charging type and the charging power of the battery. The user of the method in accordance with embodiments may therefore select between these two prioritizations and where appropriate can select a longer route so as to achieve a shorter journey time.

Figure 3:
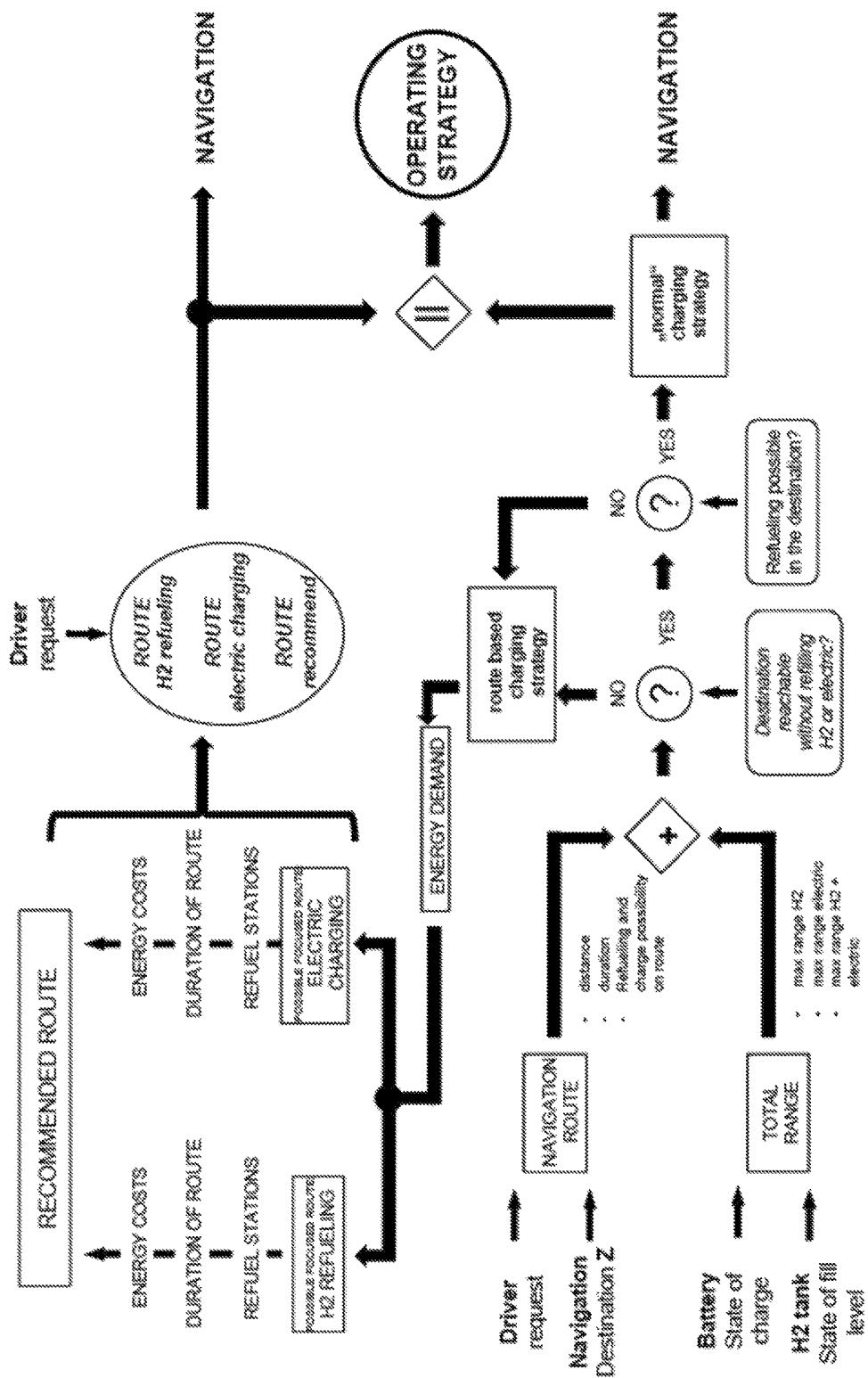
FIG. 3 illustrates schematically a procedure diagram of a method for determining and implementing an optimal route for a vehicle, in accordance with embodiments.

FIG. 3 illustrates a procedure diagram of a method in accordance with embodiments for determining and implementing an optimal route for a vehicle.

In dependence upon the energy that is available (Battery State of Charge and H2 tank State of Fill Level), and thereby, the range that the vehicle can travel (Max Range H2, Max Range Electric, Total Range), and also the destination (Driver request navigation destination) and therefore route length, duration of journey (distance, duration) and possibly the refueling possibilities that are available on the route or at the destination (Refueling and charge possibility on route), the method that is illustrated in accordance with embodiments decides initially regarding the necessity of using a route-based charging strategy (FIG. 3, left-hand side lower region) on the basis of the question whether the destination may be reached without a refueling procedure. If a route based charging strategy is not necessary since the fuel that is present is sufficient to reach the destination and also a sufficient recharging procedure of electrical current and/or hydrogen is possible at the destination for the subsequent operation, the "normal" non route-related operating strategy (normal charging strategy) that is implemented in the vehicle is used for implementing the route, in other words the operating strategy that is not dependent upon the positions of possible charging/refueling stations (FIG. 3 right-hand side lower region).

If, however, by way of example, the destination of the navigation for the prevailing range of the vehicle is too far away or there are no charging possibilities or refueling possibilities at the destination, the route-based charging strategy is selected and therefore possible routes are determined in dependence upon the geographical position both of refueling stations for the hydrogen as well as electric charging stations in the region between the current position and the destination (FIG. 3 upper left-hand side region).

Taking into account the calculated total journey time (Duration of route), the availability and positions of the potential charging possibilities/refueling possibilities (Refuel stations) and also the calculated energy costs (Energy costs), this provides a route recommendation and/or a route that prioritizes both a hydrogen refueling procedure and also an electrical recharging procedure to the driver for selection from (Route recommend, Route H2 refueling, Route electric charging).

When the selection is made manually (e.g., via Driver request) by the driver, the route is transferred to the navigation system (Navigation) and the charging strategy that is calculated for this purpose for implementing the route is transmitted to the operating strategy (Operating Strategy) (FIG. 3, right-hand side region).

Figure 4:
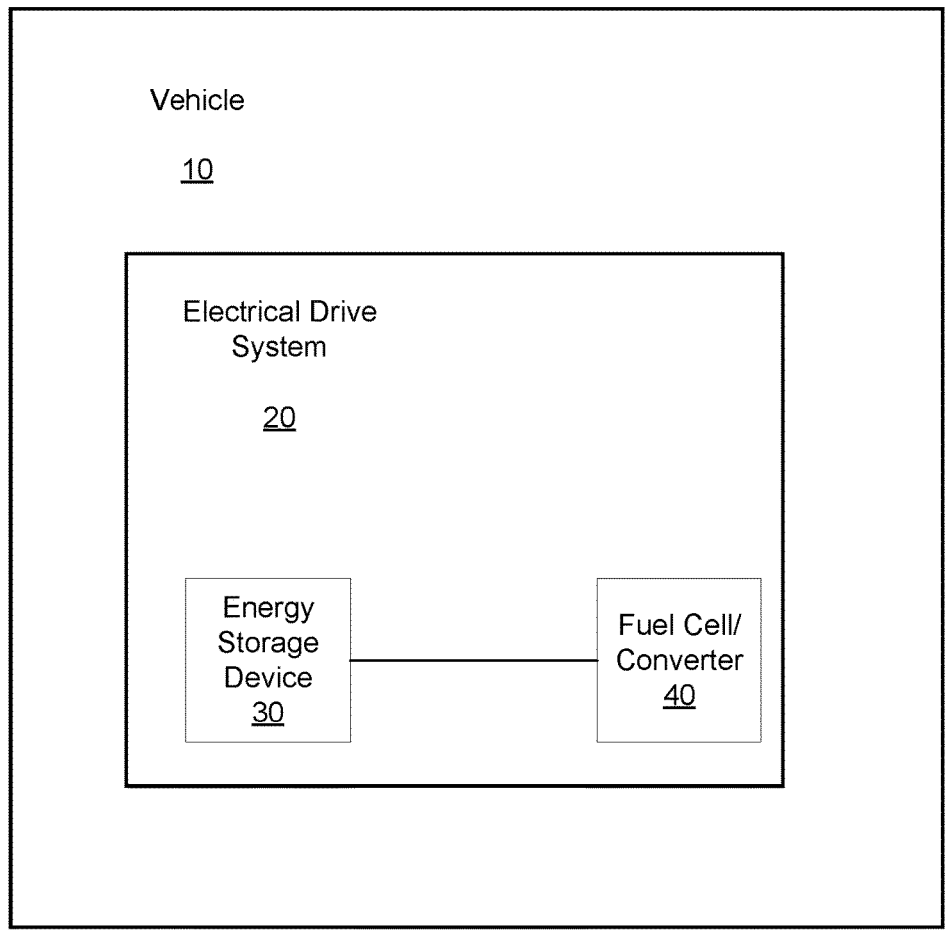
FIG. 4 illustrates schematically a vehicle, in accordance with embodiments.

FIG. 4 illustrates schematically a vehicle 10 having an electrical drive system 20 with an energy storage device 30, and a fuel cell 40 that operates as a converter to charge the energy storage device 30.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

F Route distance
P Parking time
A Starting position, current position
Z Destination
TW Hydrogen refueling station
TS Electric charging station
SOC State of charge
10 Vehicle
20 Electrical drive system
30 Energy storage device
40 Fuel cell/converter

What is claimed is:

1. A method for determining an optimal route for a vehicle having a control unit having logic, an electrical drive system with an energy storage device, and a converter to charge the energy storage device, and which is operated via a fuel, the control unit being configured to perform the method comprising:

providing a destination for the vehicle;
determining one or more possible routes from a current position of the vehicle to the destination, wherein the one or more routes is/are determined in dependence upon a geographical position of refueling stations for the fuel and electric charging stations in the region between the current position and the destination;
setting an optimal route via selecting from the determined one or more possible routes; and
implementing the optimal route via expediently operating the converter to charge the energy storage device when driving along the optimal route,
wherein if the optimal route is a route that is optimized for use of a refueling station, the optimal route is implemented in such a manner that a level of intensity of use of the converter is maximized so that a fill level of fuel is as low as possible when reaching the refueling station.

2. The method of claim 1, wherein the converter is a fuel cell.

3. The method of claim 2, wherein the fuel comprises hydrogen.

4. The method of claim 1, wherein the one or more possible routes comprises at least one route that is optimized for use of refueling stations for the fuel.

5. The method of claim 1, wherein the one or more possible routes comprises at least one route that is optimized for use of electric charging stations.

6. The method of claim 1, wherein the one or more possible routes comprise:

at least one route that is optimized for use of refueling stations for the fuel; and at least one route that is optimized for the use of electric charging stations.

7. The method of claim 1, further comprising visually displaying, to a user of the vehicle, the determined at least one possible routes.

8. The method of claim 1, further comprising visually displaying, to a user of the vehicle, a recommended route from the determined at least one possible routes.

9. The method of claim 1, further comprising visually displaying, to a user of the vehicle, at least one route that is optimized for use of refueling stations for the fuel.

10. The method of claim 9, further comprising visually displaying, to a user of the vehicle, at least one route that is optimized for use of electric charging stations.

11. The method of claim 1, wherein the optimal route is manually selected from the determined routes by the user.

12. The method of claim 1, wherein the one or more possible routes are determined in dependence upon a prevailing state of charge of the energy storage device.

13. The method of claim 1, wherein the one or more possible routes are determined in dependence upon a prevailing fill level of fuel.

14. The method of claim 1, wherein the one or more possible routes are determined in dependence upon a prevailing state of charge of the energy storage device and the prevailing fill level of fuel.

15. The method of claim 1, wherein the one or more possible routes are determined in dependence upon emissions requirements at the destination.

16. The method of claim 1, wherein the optimal route is implemented in such a manner that, after reaching the destination, the converter is operated in order to charge the energy storage device.

17. A vehicle, comprising:
an electrical drive system having an energy storage device;
a converter to charge the energy storage device, and which is operated via a fuel; and
a control unit having logic, at least partially comprising hardware configured to:
provide a destination for the vehicle;
determine one or more possible routes from a current position of the vehicle to the destination, wherein the one or more routes is/are determined in dependence upon a geographical position of refueling stations for the fuel and electric charging stations in the region between the current position and the destination;
set an optimal route via selecting from the determined one or more possible routes; and
implement the optimal route via expediently operating the converter so as to charge the energy storage device when driving along the optimal route,
wherein:
if the optimal route is a route that is optimized for use of a refueling station, the optimal route is implemented in such a manner that a level of intensity of use of the converter is maximized so that a fill level of fuel is as low as possible when reaching the refueling station, and
if the optimal route is a route that is optimized for use of electric charging station, the optimal route is implemented in such a manner that a level of intensity of use of an electrical drive system of the vehicle is maximized so that a state of charge of the energy storage device is as low as possible when reaching an electric charging station.

18. A method for operating a vehicle having a control unit having logic, the control unit being configured to perform the method comprising:
providing a destination for the vehicle;
determining, from a current position of the vehicle to the destination, one or more possible routes in dependence upon a geographical position of refueling stations for fuel for the vehicle and electric charging stations for the vehicle in the region between the current position and the destination;
setting an optimal route via selecting from the determined one or more possible routes; and
implementing the optimal route by expediently operating a converter to charge an energy storage device of an electrical drive system of the vehicle when driving along the optimal route,
wherein if the optimal route is a route that is optimized for use of an electric charging station, the optimal route is implemented in such a manner that a level of intensity of use of the electrical drive system is maximized so that a state of charge of the energy storage device is as low as possible when reaching an electric charging station.

* * * * *